United States Patent [19]

Hablitzel

[11] 4,050,726

[45] Sept. 27, 1977

[54] ENERGY ABSORBING BUMPER

[75] Inventor: Hermann Hablitzel, Wolfsburg, Germany

[73] Assignee: Volkswagenwerk Aktiengesellschaft, Germany

[21] Appl. No.: 681,818

[22] Filed: Apr. 30, 1976

[30] Foreign Application Priority Data

May 9, 1975   Germany ............................ 2520594

[51] Int. Cl.² .............................................. B60R 19/06
[52] U.S. Cl. ................................... 293/71 R; 293/98; 114/219; 188/1 C
[58] Field of Search ...................... 293/71 R, 71 P, 70, 293/88, 98; 114/219; 188/1 C

[56] References Cited

U.S. PATENT DOCUMENTS

| 3,361,475 | 1/1968 | Villiers | 188/1 C |
|---|---|---|---|
| 3,610,609 | 10/1971 | Sobel | 114/219 |
| 3,638,985 | 2/1972 | Barton | 188/1 C |
| 3,825,292 | 7/1974 | Nakamura | 293/71 R |
| 3,983,962 | 10/1976 | Torke | 188/1 C |

Primary Examiner—Trygve M. Blix
Assistant Examiner—D. W. Keen
Attorney, Agent, or Firm—Brumbaugh, Graves, Donohue & Raymond

[57] ABSTRACT

An energy absorbing bumper is designed to provide uniform decelerating forces, independent of ambient temperature. The bumper is fabricated of elastic material and has two cushion zones. The first cushion zone, which is rather easily deformable at temperatures about room temperature, predominates in absorbing impact energy at low temperatures. The second cushion zone, which is more difficult to deform, provides absorption of impact energy at higher temperatures when the elastic material from which the bumper is made is more pliable.

8 Claims, 5 Drawing Figures

ENERGY ABSORBING BUMPER

BACKGROUND OF THE INVENTION

This invention relates to energy absorbing bumpers, in particular such bumpers which are made out of elastic material and deform on impact to absorb the impact energy. Such bumpers are particularly useful for motor vehicles to prevent vehicle damage in the event of a collision.

A prior art energy absorbing bumper is described by Barton et al. in U.S. Pat. No. 3,638,985. The bumper described by Barton includes a support member, mounted to the vehicle, and a resilient member, which has a U-shaped cross section and is formed out of elastic material, such as rubber or dense urethane foam. The resilient structure is mounted to the support structure and has side walls which are thickest in the region of the support structure. The base portion of the resilient member is provided with a web, which in the event of unusually severe impact comes into contact with the support member and provides additional energy absorption when the ribs of the web structure are crushed against the support member. Deformation of the side walls of this prior art bumper absorbs impact energy from moderate force collisions, while deformation of the web provides energy absorption on the occurrence of a severe collision.

A major deficiency of the prior art impact absorbing bumper is that the absorption forces exerted by the bumper on the vehicle, and consequently the acceleration forces applied to the vehicle occupants varies in accordance with the ambient temperature. This variation in forces is a result of the variation in the elasticity of the material from which the resilient portion of the bumper is formed. FIG. 1 illustrates this variation of elasticity with temperature. The ratio of decelerating force F to vehicle mass G is plotted against temperature as curve a for a reaction cast polyurethane bumper and curve b for an ethylene-propylene-diene monomer (EPDM). From the curve of FIG. 1 it may be seen that at temperatures below approximately room temperature, there is a considerable increase in the deformation force exerted by the resilient bumper upon impact. When a moderate impact collision occurs with the prior art bumper at room temperature or above, the bumper has sufficient pliability to almost completely deform, therefore applying deceleration forces steadily during a large deformation and consequently applying a moderate deceleration force to the vehicle occupants. When the same force collision occurs at lower temperatures, the increased stiffness of the bumper material necessitates an increased force for total deformation. As a result, deformation of the bumper is not complete and the impact energy is dissipated during a lesser amount of bumper deformation. Consequently the deceleration forces exerted on the vehicle occupants are substantially increased.

FIG. 2 is a graph of bumper deceleration force plotted as a function of bumper deformation displacement s. The deformation forces associated with the prior art bumpers are plotted for four specific temperatures and indicated $-10°$ C, $-5°$, RT (room temperature), and $+60°$ C. As the graph illustrates in the event of a collision at lower temperature, for example $-10°$ C, the deformation of the bumper is approximately 40% of the deformation experienced at $+60°$ C. As a consequence, in order to dissipate the impact energy, it is necessary for the deceleration forces to be greatly increased. As can be seen from the graph, the deformation forces have a maximum at $-10°$ C which is approximately twice the maximum deformation force at room temperature or higher.

While the prior art bumper disclosed by Barton has two zones of deformation, the zones of deformation do not provide a compensation for the variation in deceleration force. The first zone of deformation disclosed by Barton is primarily effective to absorb energy in the event of a moderate impact. The second zone of deformation, which comprises compression of the web, is effective only in the event of a severe impact. In addition the second zone of deformation is rather small in actual displacement during the deformation process, necessitating extremely high forces to decelerate the vehicle in a short distance. This prior art design does not therefore compensate for variations in deformation force experienced as a result of temperature changes. The variation in deformation force for a moderate impact in the bumper described by Barton is similar to the variation to be expected in prior art bumpers wherein there is only a single cushion zone.

It is therefore an object of the present invention to provide a new and improved energy absorbing bumper.

It is a further object of the present invention to provide such a bumper wherein the impact absorbing forces exerted by the bumper are relatively constant over a wide range of temperatures.

SUMMARY OF THE INVENTION

In accordance with the present invention there is provided an energy absorbing bumper for protecting an object from damage from an impact. The bumper includes a support mounted to the object and an elastic base member arranged opposite the support. Two elastic sidewalls extend between the base member and the support. The sidewalls have a first cushion zone adjacent the support and a second cushion zone adjacent the base member. The wall thickness of the sidewalls is greater in the second cushion zone than in the first cushion zone. Deformation of the second cushion zone predominantly absorbs impact energy at temperatures near or above room temperature, while deformation of the first zone predominantly absorbs impact energy at lower temperatures.

In accordance with a preferred embodiment of the invention the zones are designed such that the maximum deformation force in the second zone at temperatures near or above room temperature is approximately equal to the maximum deformation force for the first zone at lower temperatures. The combined elastic base member and sidewalls have typically a U-shaped cross section and the sidewalls may be stepped in thickness abruptly between the first and second zones. There may be provided elastic ribs extending from the base member toward this support, which may be tapered in thickness and extend to different distances from the base member. The cushion zones are preferably of approximately equal thickness in the direction of deformation.

For a better understanding of the present invention together with other and further objects, reference is made to the following description, taken in conjunction with the accompanying drawings, and its scope will be pointed out in the appended claims.

DESCRIPTION OF THE INVENTION

Figure 3:
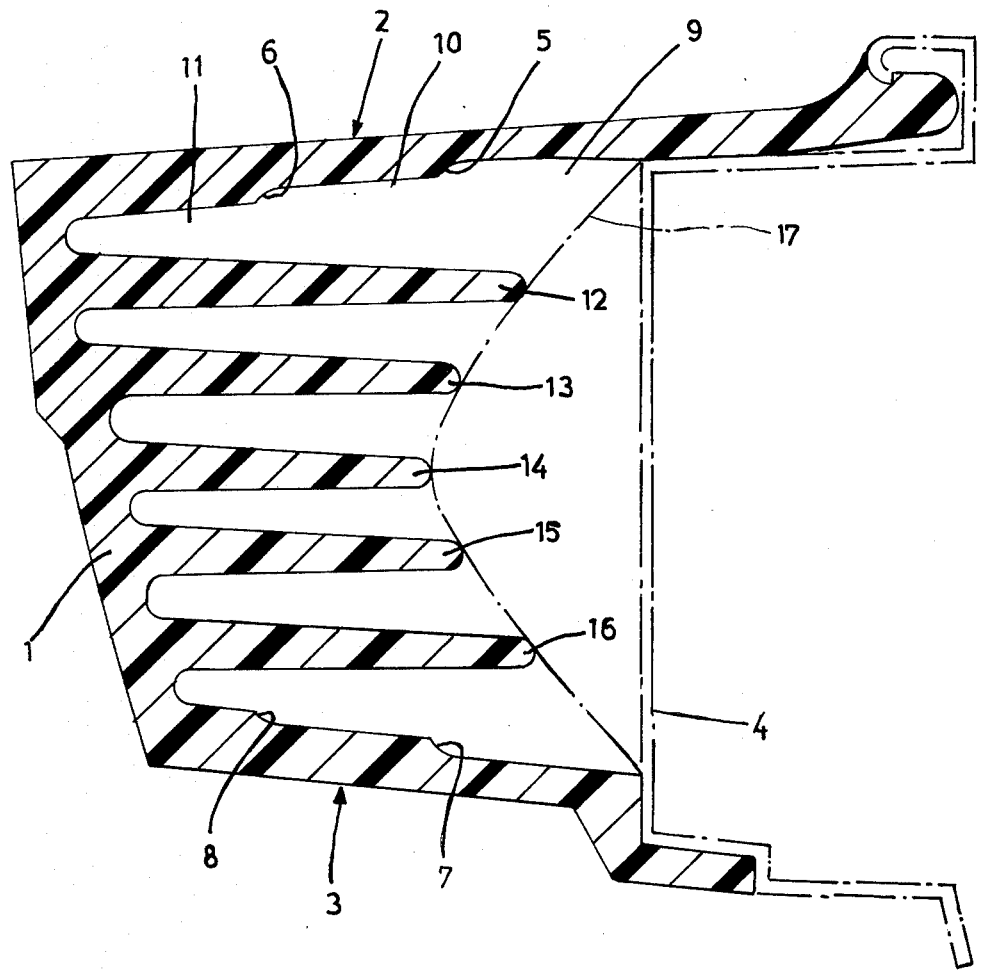
FIG. 3 is a cross sectional view of a bumper in accordance with the present invention.

FIG. 3 is a cross sectional illustration of an energy absorbing bumper in accordance with the present invention. The bumper includes an elastic base member 1 which is arranged opposite a support member 4, which may be steel or other relatively hard material. Sidewalls 2 and 3 are provided between base member 1 and support 4. In the embodiment illustrated sidewalls 2 and 3 are formed of elastic material in a single piece with base member 1. Steps 5, 6, 7 and 8 are provided in the wall thickness of sidewalls 2 and 3, dividing the bumper into three cushion zones 9, 10 and 11 which have approximately the same length in the direction of bumper deformation.

Figure 1:
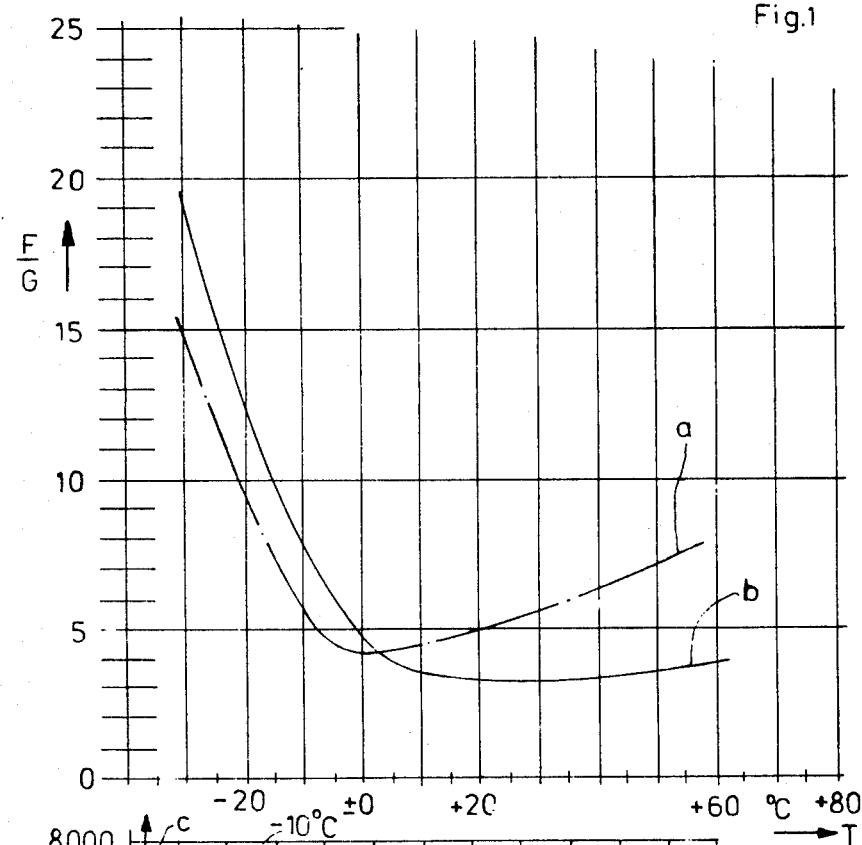
FIG. 1 is a graph illustrating the elasticity of bumper material as a function of temperature.

Upon impact of the object to which the bumper is mounted, initial deformation of the bumper takes place in cushion zone 9 because of the reduced sidewall thickness. When cushion zone 9 has been completely compressed additional deformation takes place in cushion zones 10 and 11. The wall thickness of sidewalls 2 and 3 in cushion zone 9 is comparatively small so that at room temperature or above, this zone will contribute only slightly to the consumption of energy since a rather small force will cause complete deformation of cushion zone 9. When a collision occurs at room temperature or above, most of the impact energy will be absorbed upon deformation of cushion zones 10 and 11 which will require substantially higher forces of deformation. At lower temperatures, where there is a considerable reduction in the elasticity of the material, as illustrated by FIG. 1, the deformation of cushion zone 9 will provide absorption of most of the energy associated with a moderate collision. Because of the increased stiffness of the elastic material of the bumper, there will be almost no deformation of cushion zones 10 and 11 because of their heavier structure.

Ribs 12-16 are provided for assisting in the establishment of cushion zones. In the embodiment of FIG. 3, these ribs are tapered to have a greater thickness adjacent to base member 1 than at their ends adjacent to support 4 and are arranged at varying distances from support 4 along curve 17. As the sidewalls 2 and 3 of the bumper of FIG. 1 are deformed in a collision, the ribs 12-16 come into forced transmitting contact with support member 4 and thereby increase the forces necessary for continued deformation of the bumper.

Figure 4:
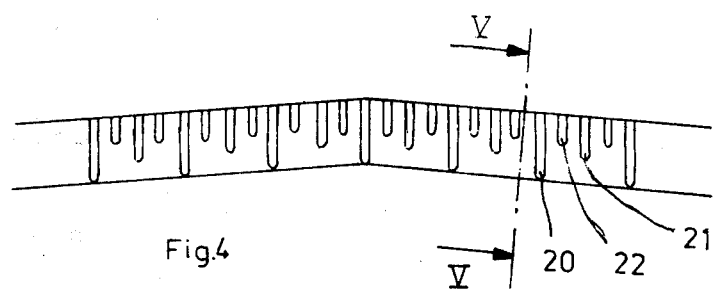
FIG. 4 is a schematic illustration of the ribs used in the FIG. 5 bumper.
Figure 5:
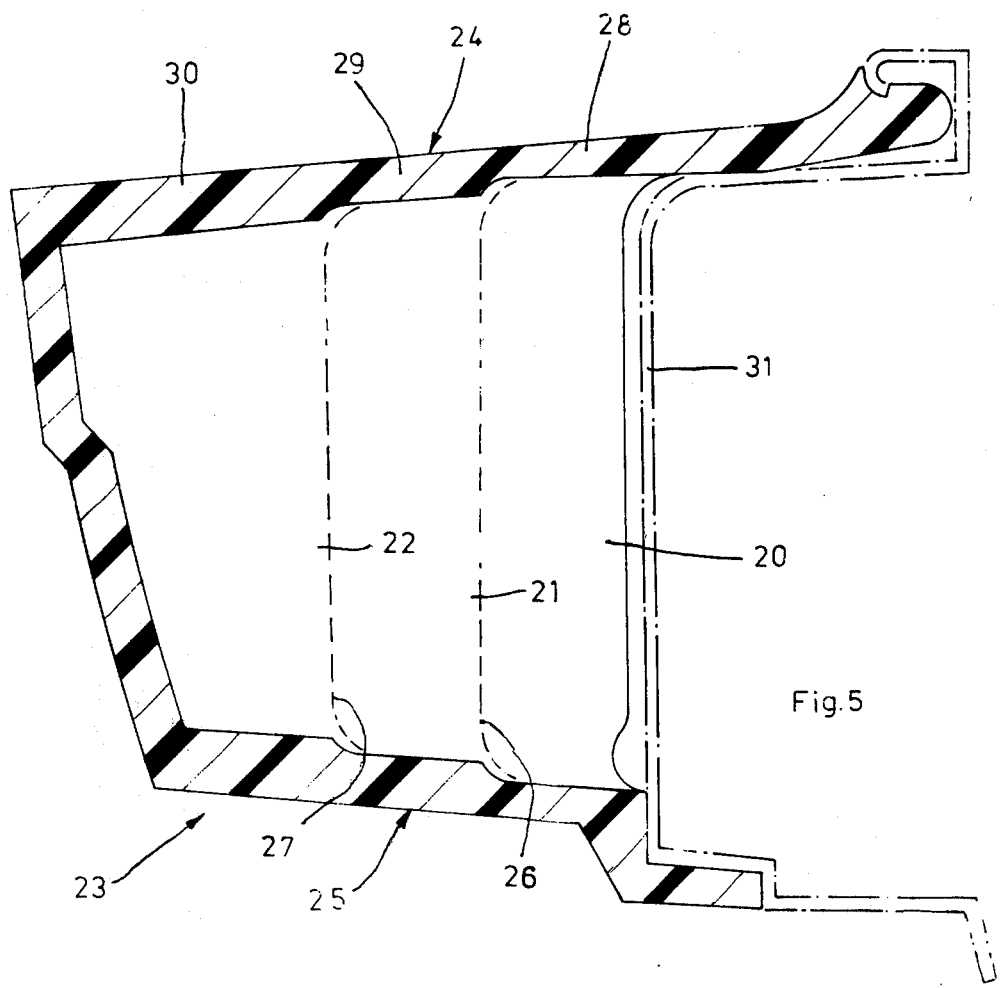
FIG. 5 is a cross sectional view of an alternate bumper in accordance with the present invention.

In the embodiment illustrated in FIG. 3, ribs 12-16 are arranged longitudinally along the bumper. Bumper 23, illustrated in FIGS. 4 and 5, has ribs 20 through 21 which are arranged transverse to the length of the bumper. FIG. 4 is a schematic top view of the bumper illustrating that ribs 20, 21 and 22 have different distances between the rib ends and base member 31. FIG. 5 is a cross sectional view which indicates that sidewalls 24 and 25 are stepped at planes 26 and 27 which coincide with the edges of ribs 21 and 22 to provide zones of varying thickness 28, 29 and 30, which in conjunction with ribs 20-22 provide bumper 23 with cushion zones 20, 21 and 22 which act similar to the zones 9, 10 and 11 of the bumper illustrated in FIG. 3.

Figure 2:
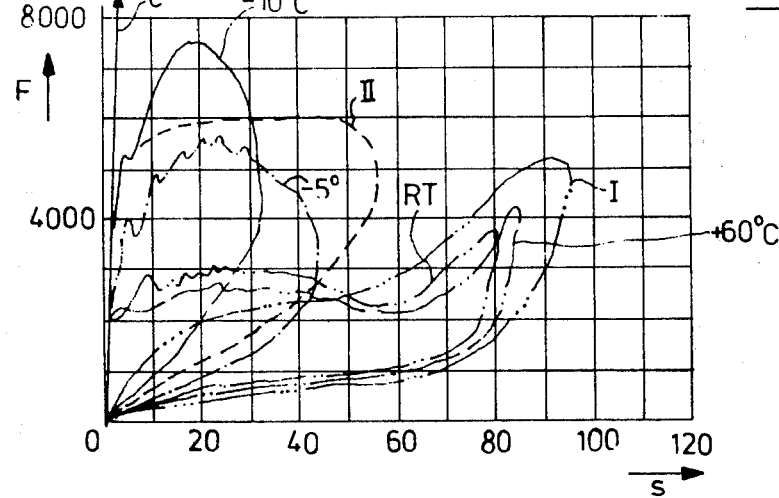
FIG. 2 is a graph indicating deformation forces as a function of deformation distance for bumpers at various temperatures.

Curves I and II in FIG. 2 illustrate the effect of the multiple cushion zones in the bumpers constructed in accordance with the present invention. Curve I represents the force and deformation displacement of a bumper in accordance with the invention at a temperature of +60° C. Curve II shows the force and deformation displacement of a bumper in accordance with the present invention at a temperature of −20° C. At the lower temperature the increased stiffness of the bumper material results in an increase in the initial deformation force as opposed to the deformation force at higher temperatures. As a consequence, most of the impact energy is absorbed during the deformation of the first and more easily deformed cushion zone. Because the first cushion zone has reduced wall thicknesses, the forces exerted are considerably less than the forces at a similar temperature in accordance with prior art bumpers. At higher temperatures, as indicated by curve I, the increase elasticity of the bumper material causes complete deformation of the first cushion zone with very little force or energy absorption. Energy absorption primarily occurs during the deformation of the second and third cushion zones. As may be seen from the illustration, the fact that the energy absorption takes place in different cushion zones at different temperatures enables the maximum force to be rendered substantially constant with temperature. Thus the force exerted by deformation in a collision at −20° C. is only 20 percent more than the force exerted by a similar collision at +60° C. in spite of an approximately two-fold change in the material elasticity.

While there have been described what are believed to be the preferred embodiments of the present invention, those skilled in the art will recognize that other and further modifications may be had thereto without departing from the true spirit of the invention, and it is intended to cover all such embodiments which fall within the true scope of the invention.

I claim:

1. An energy absorbing bumper for protecting an object from damage from an impact, comprising a support mounted to said object, an elastic base member, arranged opposite said support, and at least two elastic sidewalls extending between said base member and said support, said sidewalls having a first cushion zone adjacent said support and a second cushion adjacent said base member, the wall thickness of said sidewalls being greater in said second cushion zone than in said first cushion zone, the material characteristics and wall thickness of said first and second cushion zones being selected so that a selected impact occuring at temperatures near or above room temperature will cause deformation of said first cushion zone with substantially no dissipation of impact energy and deformation of said second cushion zone with substantial impact energy dissapation, and said selected impact occuring at lower temperature will cause deformation of said first cushion zone with substantial impact energy dissapation and will cause substantially no deformation of said second cushion zone.

2. A bumper as specified in claim 1 wherein the maximum force for deforming said second zone at temperatures near or above room temperature is approximately equal to the maximum force for deforming said first zone at lower temperatures.

3. A bumper as specified in claim 1 wherein said wall thickness increases abruptly between said first and second zones.

4. A bumper as specified in claim 1 wherein said base member and said sidewalls have a U-shaped cross section.

5. A bumper as specified in claim 1 wherein there are provided a plurality of elastic ribs extending from said base member toward said support.

6. A bumper as specified in claim 5, wherein selected one of said ribs extend to different selected distances from said base member.

7. A bumper as specified in claim 5, wherein said ribs are tapered in thickness, having the greatest thickness adjacent said base member.

8. A bumper as specified in claim 1, wherein each of said cushion zones has approximately the same dimensions in the direction of deformation.

* * * * *